T. FOSTER.
Horse Hay Fork.
No. 53,288.  Patented March 20, 1866.
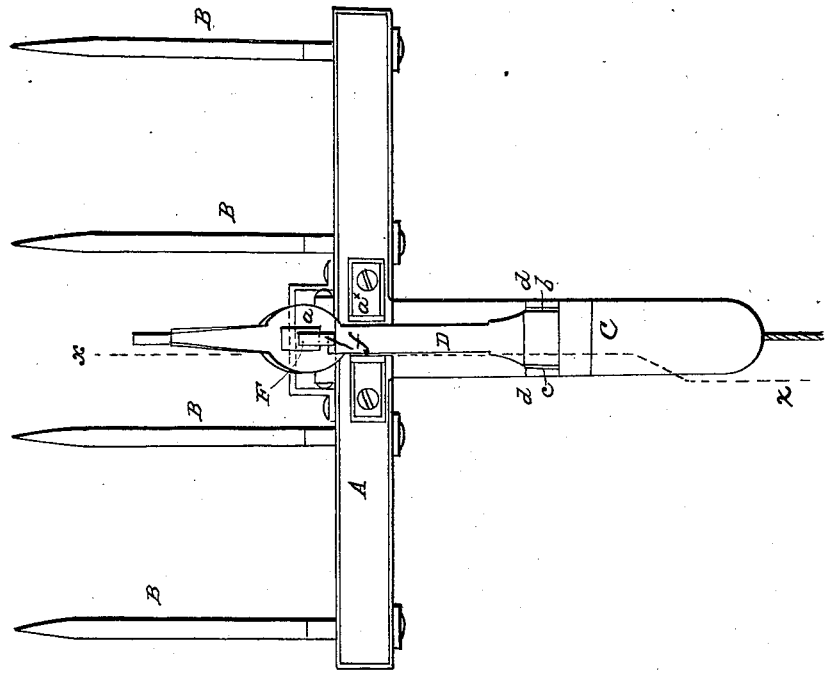
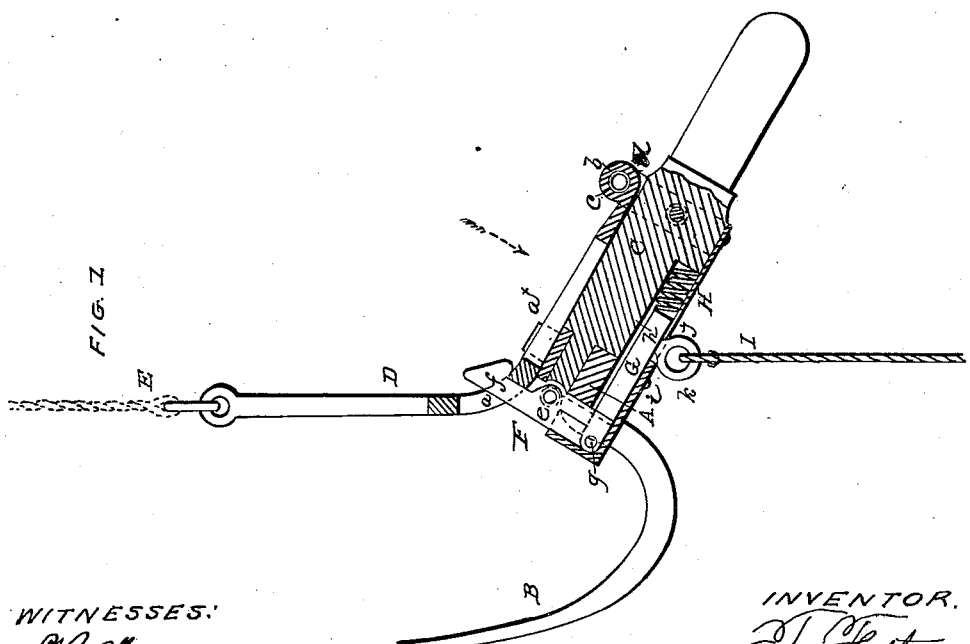
WITNESSES:  INVENTOR.

UNITED STATES PATENT OFFICE.

THEODORE FOSTER, OF COXSACKIE, NEW YORK.

IMPROVEMENT IN HORSE HAY-FORKS.

Specification forming part of Letters Patent No. 53,288, dated March 20, 1866.

*To all whom it may concern:*

Be it known that I, THEODORE FOSTER, of Coxsackie, in the county of Green and State of New York, have invented a new and Improved Horse Hay-Fork; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\, x$, Fig. 2; Fig. 2, a plan or top view of the same looking in the direction indicated by the arrow in Fig. 1.

Similar letters of reference indicate corresponding parts.

This invention relates to a new and improved horse hay-fork for elevating hay in barns and depositing it in mows.

The invention is an improvement in that class of forks which are provided with wooden heads and a handle, and has for its object simplicity and economy in construction, together with facility in operating the same.

A represents the head of the rake, which is constructed of wood and provided with teeth or tines B. These parts may be constructed in the usual way. C is the handle framed into the rear side of the head A in the ordinary manner.

D is a metal bar, which is curved or bent so as to form an obtuse angle at about its center, where there is made an eye or opening, $a$. This bar D is connected at one end to the handle C by a hinge, $b$, the pintle $c$ of which passes through metal straps $d\, d$, attached one to each side of C. The eye $a$ is directly over the front edge of the head A at its center, and to the upper end of the bar D the hoisting-rope E is attached.

F is a latch or fastening, which is a short bar attached by a pivot, $e$, to the front side of the head A. The upper end of the bar is provided with a catch, $f$, which, when the fork is adjusted for use, passes through the eye $a$ and hooks over the back edge of the same, as shown in Fig. 1, keeping the lower part of the bar D in close contact with the handle C, lateral movement of D being prevented by a socket, $a^{\times}$. The lower end of this bar is connected by a pivot, $g$, with a sliding bar, G, which is fitted in a recess, $h$, made longitudinally in the under side of the handle C, and having a spring, H, bearing against its outer end, which spring has a tendency to keep the catch $f$ over the back edge of the eye $a$, as clearly shown in Fig. 1.

The recess $h$ is covered by a metal plate, $i$, to keep the bar G in place, and this plate has an oblong slot, $j$, made in it, through which a ring, $k$, attached to said bar passes, the ring having a cord, I, connected to it.

From the above description it will be seen that when the fork with its load is elevated to the desired height the operator, by pulling the cord I, may draw back the bar G, and thereby release the catch $f$ from the eye $a$, which will cause the fork to tilt and discharge its load, and when the fork is lowered the operator shoves the tines B into the hay and shoves down the bar D, so that the latch or fastening F will engage with it, and the fork is again ready to be elevated.

The hoisting-rope E is arranged over pulleys at the upper and lower part of the barn, and has the draft-animal attached to it as usual.

Thus by this simple arrangement a strong, economical, and durable horse hay-fork is obtained, and one which may be operated or manipulated with the greatest facility. The latch or fastening F, in consequence of the bar on which the catch $f$ is formed being arranged to work on a pivot, $e$, may be operated without any trouble whatever.

I claim as new and desire to secure by Letters Patent—

The bent bar D, provided with the eye or opening $a$ and attached to the handle C by the hinge $b$, in combination with the latch or fastening F, composed of the slide G and the bar provided with the catch $f$, and pivoted to the head A, all being applied to the fork and arranged to operate substantially in the manner as and for the purpose herein set forth.

THEODORE FOSTER.

Witnesses:
WM. COCHRAN,
DANIEL VROOMEN.